(12) United States Patent
Yam

(10) Patent No.: US 7,382,749 B2
(45) Date of Patent: Jun. 3, 2008

(54) SYSTEMS, METHODS, AND APPARATUS WITH A COMMON WIRELESS COMMUNICATIONS PROTOCOL

(75) Inventor: Eric Yam, San Diego, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 875 days.

(21) Appl. No.: 10/402,645

(22) Filed: Mar. 28, 2003

(65) Prior Publication Data
US 2004/0100924 A1 May 27, 2004

Related U.S. Application Data

(60) Provisional application No. 60/429,482, filed on Nov. 26, 2002.

(51) Int. Cl.
*H04Q 7/20* (2006.01)
(52) U.S. Cl. ............... 370/331; 370/328; 370/349; 455/550.1; 455/561
(58) Field of Classification Search ............. 370/331, 370/328, 349, 550.1, 561
See application file for complete search history.

(56) References Cited

U.S. PATENT DOCUMENTS

| | | | | |
|---|---|---|---|---|
| 6,567,387 | B1* | 5/2003 | Dulin et al. ............... | 370/329 |
| 6,862,272 | B2* | 3/2005 | Dulin et al. ............... | 370/330 |
| 6,879,581 | B1* | 4/2005 | Leung ....................... | 370/352 |
| 6,934,266 | B2* | 8/2005 | Dulin et al. ............. | 370/310.1 |
| 6,947,444 | B2* | 9/2005 | Heller ....................... | 370/466 |
| 2002/0141391 | A1* | 10/2002 | Hsu .......................... | 370/352 |
| 2003/0235206 | A1* | 12/2003 | Heller ....................... | 370/467 |
| 2004/0032853 | A1* | 2/2004 | D'Amico et al. .......... | 370/349 |
| 2004/0085997 | A1* | 5/2004 | Mancour .................... | 370/466 |
| 2004/0203365 | A1* | 10/2004 | Yamamoto et al. ........ | 455/41.2 |

OTHER PUBLICATIONS

V. Jacobson; Compressing TCP/IP Headers for Low-Speed Serial Links; Feb. 1990; http://www.rfc-editor.org/rfc/rfc1144.txt; p. 1-30.
Final Text of DIS 8473, Protocol for Providing the Connectionless-mode Network Service; Mar. 1986; http://www.freesoft.org/CIE/RFC/bynum.cgi?994; p. 1-33.
Tom Sheldon: Encyclopedia of Networking, Electronic Edition; Osborne McGraw-Hill Publishers, Berkely, CA; 1998; pp. 763-766, 804-808, 1091-1097.

* cited by examiner

*Primary Examiner*—Danh Le
(74) *Attorney, Agent, or Firm*—Blakely, Sokoloff, Taylor & Zafman LLP

(57) ABSTRACT

A Common Wireless Communications Protocol (CWCP) below the TCP/IP layer is a part of OSI layer 3a (SNDCF-Subnetwork Dependent Convergence Functions). CWCP serves as a common Application Program Interface (API) to the upper application layers. CWCP supports different call processing standards (GSM, WCDMA, CDMA2000) and provides seamless Web or e-mail interfaces using Wireless Application Protocol (WAP) or Transport Layer Interface (TLI) by the CWCP interfacing with the different physical layer (3G) standards. CWCP provides interoperability between the different physical standards and provides a plug-and-play environment for different wireless devices and applications. CWCP provides interoperability at the systems level via interoperable software through the IP software layer.

20 Claims, 13 Drawing Sheets

Comparison of CDMA Systems

| | IS-95 | CDMA 2000 | W-CDMA |
|---|---|---|---|
| Band Width (MHz) | 1.25 | 5.0 | 5.0 |
| Chip Rate (Mcps) | 1.2288 | 3.6864 | 4.096 |
| Data Rate (kpbs) | 9.6 | 384 | 384 / 2 Mbps |
| Packet & Circuit Switch Data | N | Y | Y |
| Simultaneous Data & Voice | N | Y | Y |
| Power Control | Rev T=1.25ms | Fwd & Rev T=1.25ms | Fwd & Rev T=0.625ms |
| Intercell Sync. | Sync | Sync | Async |

*FIG. 2*

GSM Evolution

Today:
- 200 kHz channels
- GMSK modulation
- 122 kbps ( 8 slots)

Enhancement: EDGE
- 8 - PSK
- 553.6 kbps (8 slots)

*FIG. 3*

| Layer | | |
|---|---|---|
| 7 | Application | Applications access network services such as file transfer and email |
| 6 | Presentation | Translates application data and also manages data security/compression |
| 5 | Session | Establishes connections between applications on different computers and regulates dialog control between the two computers in a session |
| 4 | Transport | Handles error recognition and recovery. (TCP or UDP) |
| 3 | Network | Translates logical/physical addresses and manages routing. (IP) |
| 2 | Data Link | Define rules for sending/receiving data across the physical connection between two systems |
| 1 | Physical | Transmits/receives bits from one computer to another and regulates the bit streams over the physical medium. (ethernet, 802.11) |

*FIG. 4*

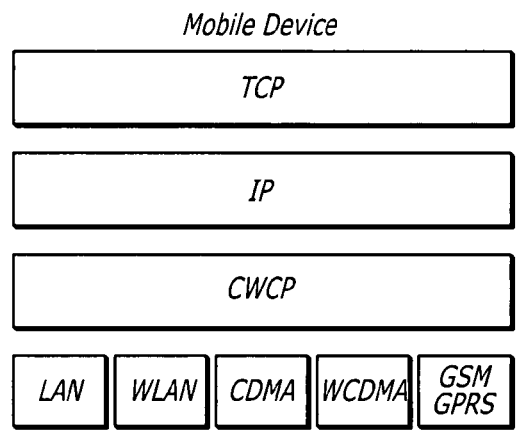

*FIG. 6B*

| WPID | Wireless Protocol Identifier |
|---|---|
| 0 | reserved |
| 1 | WiFi (802.11a, 802.11b...) |
| 2 | CDMA |
| 3 | GSM/GPRS |
| 4 | WCDMA |
| 5-15 | Reserved for future use |
FIG. 8
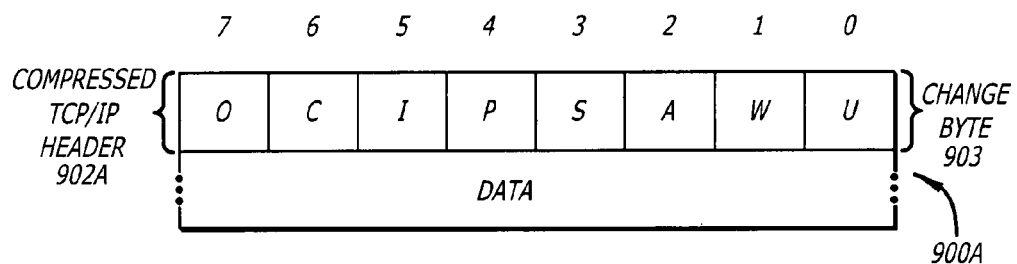
FIG. 9A
FIG. 9B
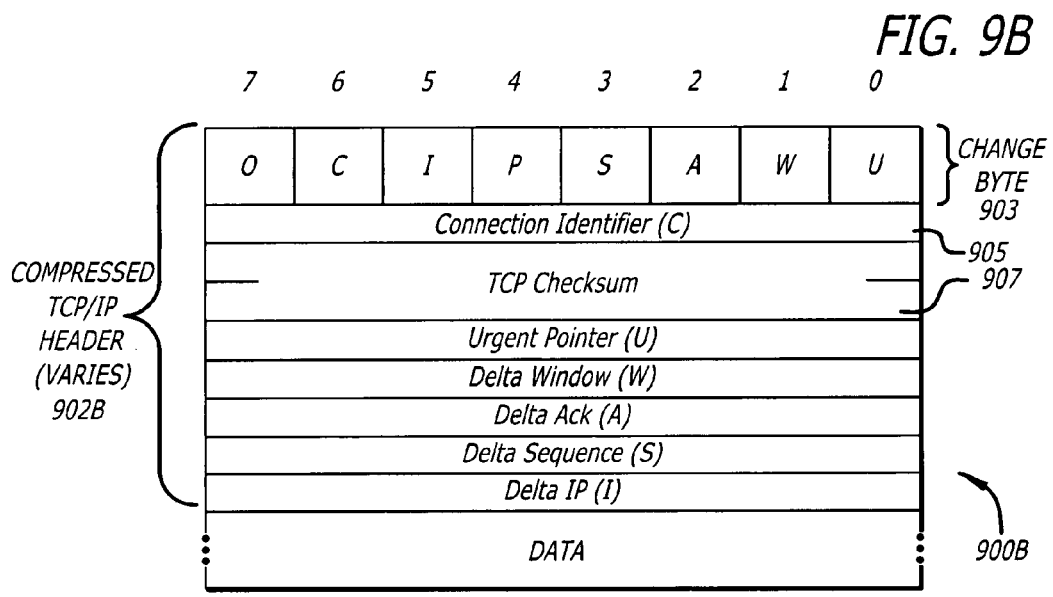

SYSTEMS, METHODS, AND APPARATUS WITH A COMMON WIRELESS COMMUNICATIONS PROTOCOL

CROSS REFERENCE TO RELATED APPLICATIONS

This U.S. Non-Provisional Patent Application claims the benefit of U.S. Provisional Patent Application No. 60/429,482 entitled "COMMON WIRELESS COMMUNICATIONS PROTOCOL", filed Nov. 26, 2002 by Eric Yam.

FIELD OF THE INVENTION

This invention relates generally to wireless communication and networking. More particularly, the invention relates to networking and communication protocols for wireless interfaces in wireless communication and networking systems.

BACKGROUND OF THE INVENTION

The developments of wireless standards continue to make progress faster than anyone could imagine. FIG. 1 illustrates a timeline of the Wireless Technology Evolution. A first generation (1G) of wireless network communication was provided by analog signals in analog mobile phone systems (AMPS). However, analog mobile phone systems were inefficient in using the bandwidth allocated to the communication channels (i.e., carrier frequencies). As more users desired service at the same time, AMPS became a bottleneck. In the second generation (2G), the wireless communication systems went digital adopting one of a plurality of digital communication standards, such as TDMA, CDMA, or a GSM digital communication standard. Initially, these systems were optimized for voice communication as opposed to data communication. Some wireless communication systems provided limited digital coverage areas as cellular base stations were not installed in every location. Some service providers provided analog roaming in those areas where digital communication was unavailable because the AMPS was universally used in many areas, particularly in the United States. These systems were referred to as dual mode systems. However when communicating in one mode, a user could not switch automatically to another system. That is one could not seamlessly switch from a digital communication system to an analog communication system when the signal faded. Instead, the call was usually dropped and a user would have to redial to use the analog communication system instead of the digital system, which became unavailable for some reason.

In third generation (3G) digital wireless communication systems and protocols, data communication is being emphasized in contrast to voice communication, although voice communication benefits as well from higher bandwidths and data rates. However, to support these new digital wireless communication protocols, the digital cellular infrastructure needs to be updated. That is, the base stations need to be modified to support the new systems. Thus, it will take some time before all base stations support the third generation digital wireless communication system. Thus, a mobile device or unit could move from one location supporting WCDMA, for example, to another location only supporting CDMA. In which case the mobile device or unit needs to be backward compatible with one or more of the older generations of wireless communication systems.

Moreover even if the mobile device or unit is backward compatible, a seamless handoff from one wireless communication system to another during the same communication session was previously unavailable. Presently in order to switch from one communication system to another, a first communication session using the first communication system is manually terminated and a second communication session is manually initiated using the second communication system.

In addition to voice communication, the third generation of digital wireless communication systems has been improved to provide data communication at relatively high speeds.

Referring now to FIG. 2, a chart of parameters for comparing CDMA systems is illustrated. The earlier generation of CDMA system, IS-95, provided a maximum data rate of 9.6 kilobits per second (kbps). The latest generation of CDMA systems, CDMA2000 and W-CDMA, provide a maximum data rate of 384 kbps and 384/2 mega-bits per second (Mbps) respectively to support a High Speed Data Rate (HDR) for data communication.

Referring now to FIG. 3, a chart of parameters for comparing GSM systems is illustrated. Current GSM communication systems provide a maximum data rate of 122 kbps for 8 slots. Third generation of GSM communication systems, EDGE, are being designed to provide a maximum data rate of 553.6 kbps for 8 slots to support a High Speed Data Rate (HDR) for data communication.

As previously discussed, the infrastructure of base stations needs to be upgraded to support the third generation of wireless communication systems. However, the mobile devices or units need to be upgraded as well to support the next generation of wireless communication systems.

BRIEF SUMMARY OF THE INVENTION

The invention is briefly summarized by the claims that follow below. In one embodiment, a mobile device for seamless multimode wireless communication over a plurality of wireless communication systems is disclosed. The mobile device includes an antenna; a wireless transceiver coupled to the antenna for communicating over a first wireless communication system or a second wireless communication system; a processor coupled to the wireless transceiver; a processor readable storage medium coupled to the processor; and processor readable code stored in the processor readable storage medium for execution by the processor. The processor readable code is to pack transmit data into packet data units for transmission over the first wireless communication system or the second wireless communication system. The packet data units have a header with a wireless protocol identifier to identify either the first wireless communication system or the second wireless communication system over which the packet data units are transmitted. The processor readable code is to further unpack packet data units received over the first wireless communication system or the second wireless communication system into receive data. The packet data units which are received have a header with a wireless protocol identifier to identify the first wireless communication system or the second wireless communication system over which the packet data units are received.

In another embodiment of the invention, a method of passing messages between layers of software code for multimode wireless communication over a plurality of wireless communication systems with differing communication protocols is disclosed. The method includes packing transmit data into a data portion of a transmit protocol data unit; and prepending a header portion of the transmit protocol data unit to the data portion of the transmit protocol data unit. The header portion includes a wireless protocol identifier to identify one of the plurality of wireless communication systems over which the transmit protocol data unit is to be transmitted. The method may further compress the header portion using header compression techniques, and compress the data portion using data compression techniques. After communicating the transmit protocol data unit as a wireless communication over one of the plurality of wireless communication systems and receiving the wireless communication a received protocol data unit; the method further includes stripping the header portion of the received protocol data unit from the data portion; and unpacking the data portion of the received protocol data unit into received data. The header portion includes a wireless protocol identifier to identify the one of the plurality of wireless communication systems over which the received protocol data unit was received. If the header and data were compressed, the method may further include decompressing the compressed header portion into a received header, and decompressing the compressed received data into received data. The plurality of wireless communication systems and the differing wireless communication protocols include AMPS, GSM, GPRS, CDMA, TDMA, CDMA2000, WCDMA, WLAN, WIFI, and Bluetooth.

In another embodiment of the invention, a base station of a plurality of base stations within a wireless communication system for multimode wireless communication is provided. The base station includes an antenna; a wireless transceiver coupled to the antenna which can transmit and receive using a plurality of wireless communication protocols; a processor coupled to the wireless transceiver; a processor readable storage medium coupled to the processor; and processor readable code stored in the processor readable storage medium for execution by the processor. The processor readable code is to pack transmit data into packet data units for transmission over the wireless communication system using one of the plurality of wireless communication protocols, and to unpack packet data units received from the wireless communication system into receive data. The packet data units have a header with a wireless protocol identifier to identify the one of the plurality of wireless communication protocols with which the packet data units are to be transmitted and received. The wireless transceiver may include a multiplexer and demultiplexer coupled to the antenna, and a plurality of wireless transceivers one for each of the plurality of wireless communication protocols.

In yet another embodiment of the invention, a method of communicating data to and from a wireless device over one of a plurality of different wired and wireless communication protocols is disclosed. At a sending end the method includes packing data into a data portion of a protocol data unit, and adding a header portion of the protocol data unit to the data portion of the protocol data unit, the header portion including a wireless protocol identifier to identify one of the plurality of different wired and wireless communication protocols through which the protocol data unit is to be transmitted from the sending end. At a receiving end the method further includes removing the header portion of the protocol data unit from the data portion of the protocol data unit, the header portion including the wireless protocol identifier to identify the one of the plurality of different wired and wireless communication protocols through which the protocol data unit was received; and unpacking the data portion of the protocol data unit into data at the receiving end.

These and other embodiments of the invention are more fully summarized in the claims as well as being shown in the figures and described in greater detail in the detailed description to follow.

BRIEF DESCRIPTIONS OF THE DRAWINGS

FIG. 2 is a chart illustrating a comparison of parameters for various CDMA wireless communication protocols.

FIG. 3 is a chart illustrating the evolution of the GSM wireless communication protocol.

FIG. 4 is a diagram illustrating the Open Systems Interconnection (OSI) Reference Model as applied to wireless communication standards.

FIG. 6B is a diagram illustrating another embodiment of a CWCP Protocol Stack for a mobile device.

FIG. 8 is a table illustrating wireless protocol identifiers (WPID) for one embodiment of the invention.

FIG. 9A is a diagram illustrating a first embodiment of a TCP segment with a compressed TCP/IP Protocol Header for CWCP.

FIG. 9B is a diagram illustrating a second embodiment of a TCP segment with a compressed TCP/IP Protocol Header for CWCP.

DETAILED DESCRIPTION OF THE PREFERRED EMBODIMENT

Figure 1:
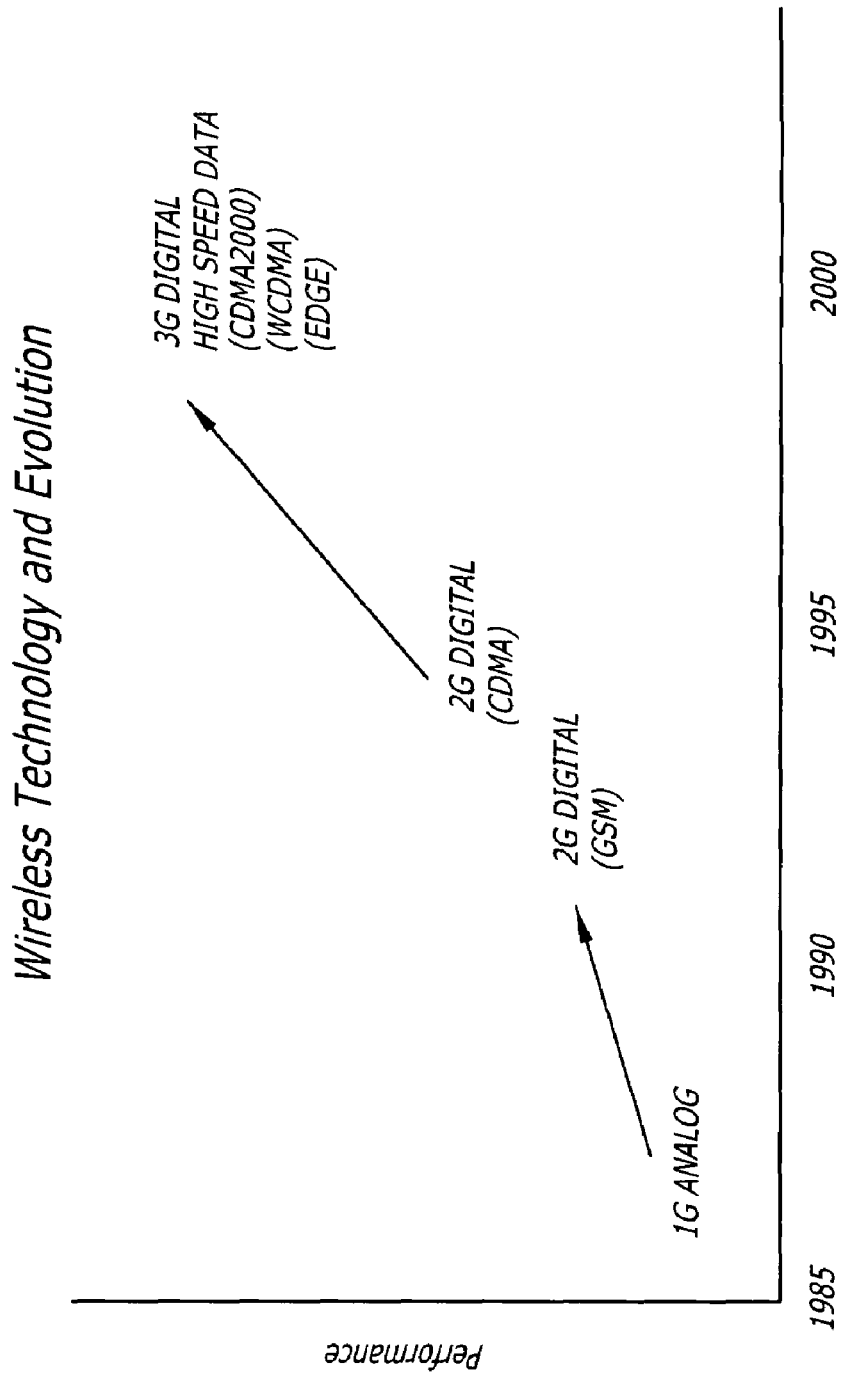
FIG. 1 is chart of a time line diagram illustrating the evolution of wireless technology and the associated communication systems and protocol.

In the following detailed description of the invention, numerous specific details are set forth in order to provide a thorough understanding of the invention. However, the invention may be practiced without these specific details. In other instances well known methods, procedures, components, and circuits have not been described in detail so as not to unnecessarily obscure aspects of the invention.

Wireless Communications continue to expand and International Standards (IS) continue to improve as part of the Y2K Internet revolution. The next generation (3G) phones, computers, handhelds, cable set top boxes or mobile electronics will be here sooner than later. A common protocol to support future, current and legacy protocol standards is desirable.

This invention provides a Common wireless Communications Protocol (CWCP) to serve as a common Application Program Interface (API). In the OSI model, the invention is below the TCP/IP layer and is a part of OSI layer 3a (SNDCF-Subnetwork Dependent Convergence Functions). The CWCP supports different call processing standards (e.g., Global System for Mobility (GSM), Wideband Code Division Multiple Access (WCDMA), Code Division Multiple Access 2000 (CDMA2000)) using OSI layers and provides seamless Web or e-mail interfaces using Wireless Application Protocol (WAP) or Transport Layer Interface (TLI) by the CWCP interfacing with the different physical layer (3G) standards. CWCP provides interoperability between the different physical standards. CWCP provides a plug-and-play environment for different wireless devices and applications based on a layered open standard. CWCP provides interoperability at the systems level via interoperable software through the IP software layer.

Referring now to FIG. 4, an Open Systems Interconnection (OSI) Reference Model applied to wireless communication standards is illustrated. FIG. 4 illustrates seven layers ranging from the physical layer to the application layer, layer 1 (Physical), Layer 2 (Data Link), Layer 3 (Network), Layer 4 (Transport), Layer 5 (Session), Layer 6 (Presentation), and layer 7 (Application). The wireless communication standards of IEEE 802.11a, IEEE 802.11b, CDMA, WCDMA, CDMA2000, GSM/GPRS are defined at layers 2 and 1 of the model of FIG. 4. Each of these wireless standards has its own requirements to connect to the network through the Network layer (layer 3). CWCP is below the TCP/IP layer and is a part of OSI layer 3a (SNDCF-Subnetwork Dependent Convergence Functions) to provide a common interface for mobile devices so that different wireless interfaces can coexist within the same mobile device and seamlessly (i.e., automatically) provide system to system handoffs, such as while roaming, without the need for manual selection and/or restarting the wireless networking session. Layer 3a, the subnetwork layer, defines rules for mapping the services provided by the data link modules to those expected by the network layer. CWCP provides network connection mapping through the use of a Subnetwork Dependent Convergence Function (SNDCF) of Open Systems Interconnection (OSI) Layer 3a.

Figure 5:
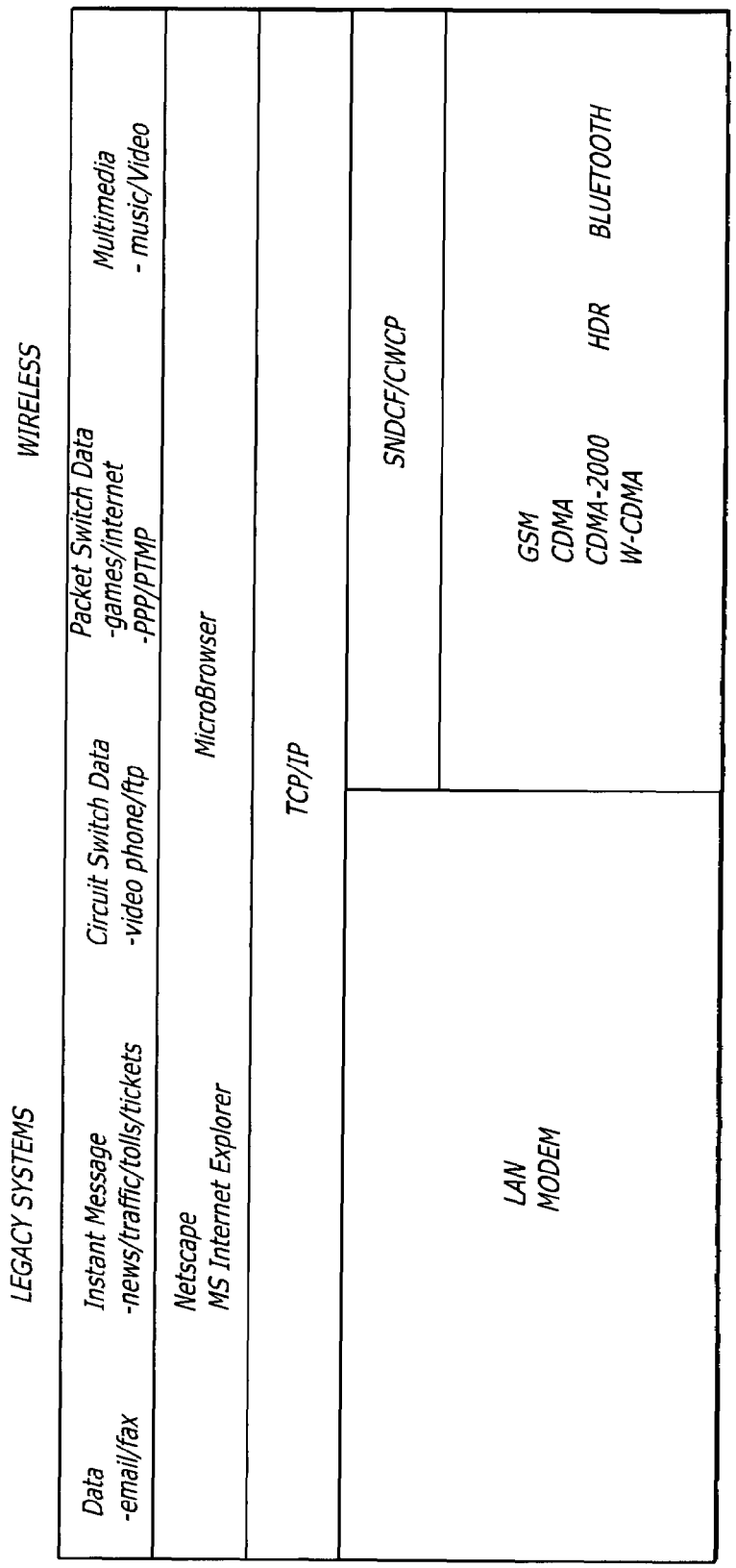
FIG. 5 is a diagram illustrating the communication protocol stack architecture for various communication systems.

Referring now to FIG. 5, a Communication Protocol Stack Architecture is illustrated. For mobile computer terminals, CWCP provides a CDMA plug-in interface, a GSM plug-in interface or a combination of all of the interfaces to be used individually or altogether.

Figure 6A:
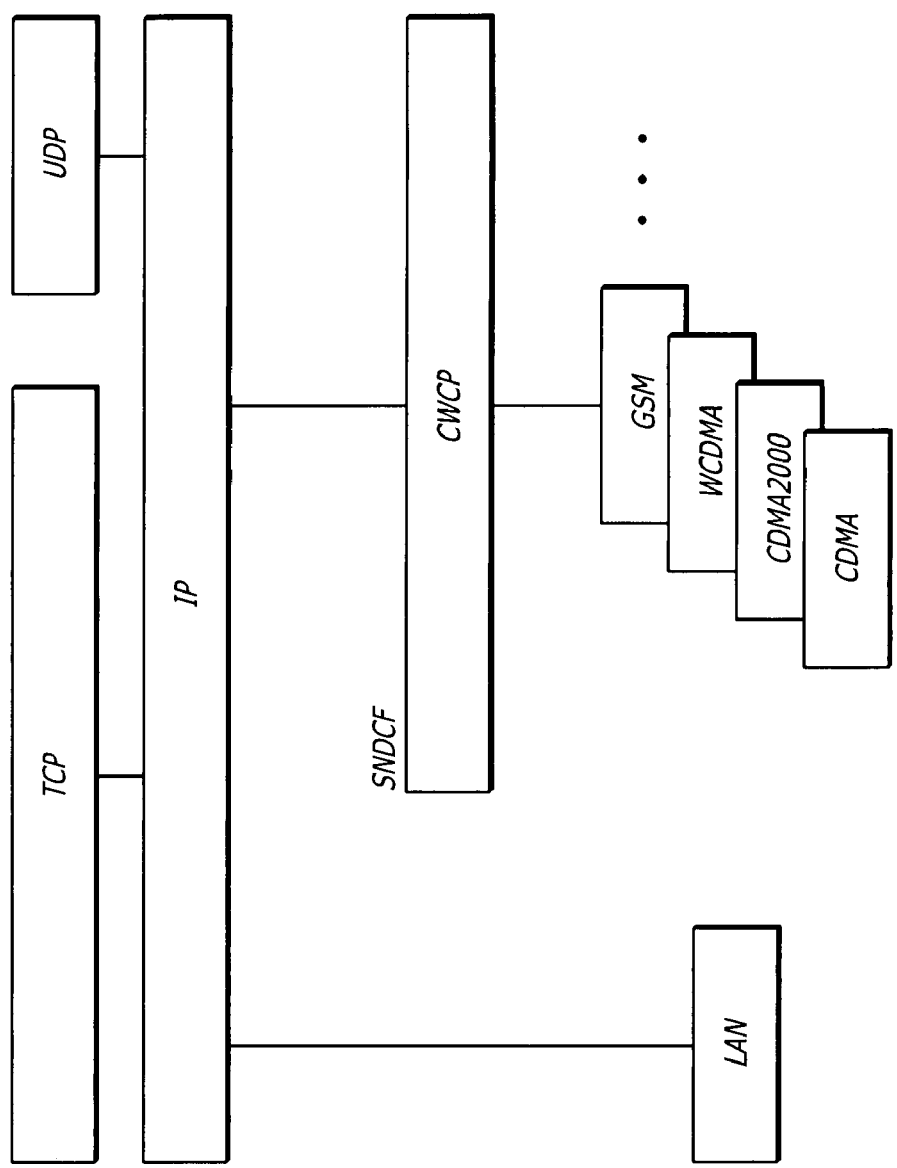
FIG. 6A is a diagram illustrating an embodiment of a common wireless communications protocol (CWCP) Protocol Stack for a mobile device, such as a wireless networked computer.

Referring now to FIG. 6A, a CWCP Protocol Stack is illustrated for a mobile device, such as a wireless networked computer. CWCP provides service between a wired local area network (LAN), wireless local area network (WLAN), code division multiple access (CDMA), wideband code division multiple access (WCDMA), and global system for mobility (GSM)/general packet radio service (GPRS), time division multiple access (TDMA) interfaces and the internet protocol (IP) of the networking layer. CWCP provides a common interface between the different physical wireless interfaces in mobile devices while roaming to maintain a wireless network connection. The common wireless communication protocol (CWCP) provides network connection mapping across these different interfaces. In this embodiment, CWCP provides both wired (LAN) and wireless interfaces (WLAN, CDMA, WCDMA, and GSM/GPRS) for the data link layer. At the transport layer either Transmission Control Protocol (TCP) or User Datagram Protocol (UDP) may be used to interface to IP of the network layer.

Referring now to FIG. 6B, another CWCP Protocol Stack is illustrated as another embodiment of the invention. In this embodiment, CWCP provides support to the wireless interfaces (WLAN, CDMA, WCDMA, GSM/GPRS, and TDMA) and not the wired interfaces such as a wired LAN for the data link layer. CWCP is based on the International Organization for Standardization (ISO) Network Working Group's Request for Comments: 994, (RFC 994), ISO 8473, entitled "Final Text of DIS 8473, Protocol for Providing the Connectionless-mode Network Service". CWCP uses RFC 994 for guidance in the use of SNDCF (Subnetwork Dependent Convergence Functions) in providing a common interface among current and future wireless standards. Subnetwork Dependent Convergence Function provides an underlying connectionless-mode service in the case where a real subnetwork does not inherently provide the connectionless-mode service assumed by the protocol. If a subnetwork inherently provides a connection-mode service, a Subnetwork Dependent Convergence Function provides a mapping into the required underlying service. Subnetwork Dependent Convergence Function provides a mapping into the required underlying service. Subnetwork Dependent Convergence Functions may also be required in those cases where functions assumed from the underlying service are not performed. In some cases, this may require the operation of an explicit protocol (i.e., a protocol involving explicit exchanges of protocol control information between peer network-entities) in the Subnetwork Dependent Convergence Protocol (SNDCP) role. However, there may also be cases where the functionality required to fulfill the SNDCP role consists simply of a set of rules for manipulating the underlying service.

To interface between the network layer and the different wireless data link layer, there are two types of services provided by CWCP that allows for the wireless data link characteristics. The first type of service bridges between the requirements of the network layer and the service characteristics of the wireless data link layer. These bridging functions include: (a) Managing the difference between the data link frame size and the network data packet, and (b) Managing the use of a single network connection by multiple wireless link layer connections. The second type of service provided by CWCP focuses on more efficient utilization of the data link. The specific services are: (a) High value of data link resources, and (b) Shared physical medium.

In order to support the first type of service bridging between the network layer and the wireless data link layer, segmentation/reassembly and multiplexing functions are required. To address differences between the maximum protocol data unit sizes, the CWCP provides a segmentation and reassembly service. Each network layer data packet is examined prior to its submission to the wireless data link layer unit (i.e., CDMA, WCDMA, GSM/GPRS, TDMA, WLAN) for delivery. Any network data packet that is larger than the data link frame size for transmission over the physical layer (i.e., CDMA, WCDMA, GSM/GPRS, TDMA, WLAN) is split into multiple units or segments. In which case, a CWCP header is appended to each segment. The CWCP header provides information to allow reassembly of the data segments by the receiver.

There are two types of data link services that may be used by CWCP, an acknowledged data link service and an unacknowledged data link service. The type of packet data units communicated differs depending upon the type of data link service being used.

Figure 7A:
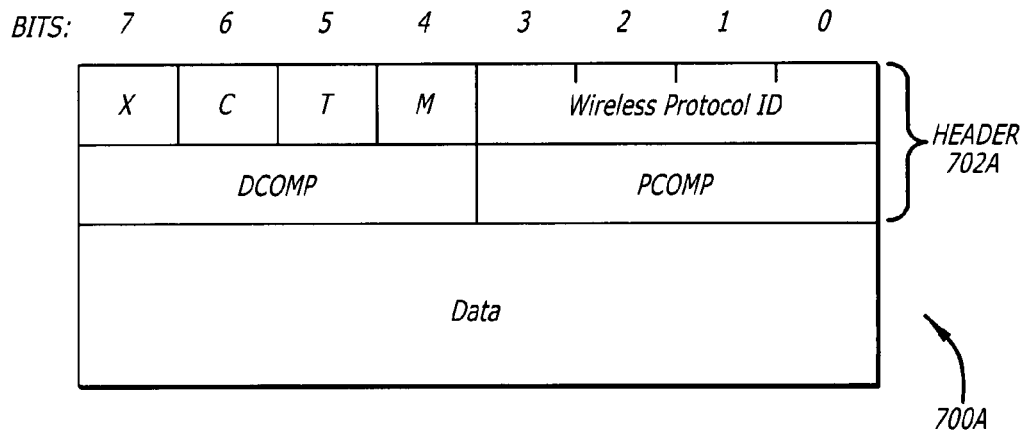
FIG. 7A is a block diagram illustrating a subnetwork data protocol data unit (SN-Data PDU) of the CWCP of the invention.
Figure 7B:
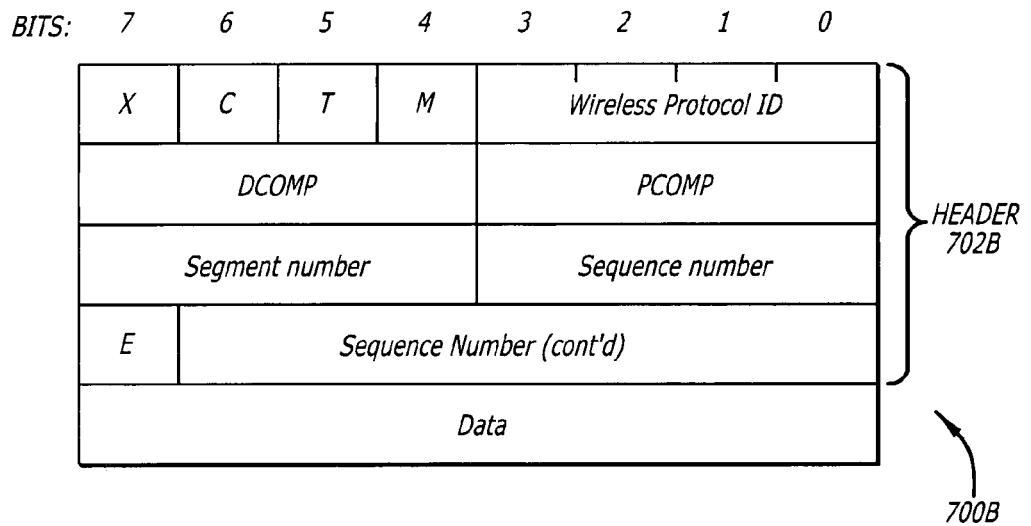
FIG. 7B is a block diagram illustrating a subnetwork unitdata protocol data unit (SN-Unitdata PDU) of the CWCP of the invention.

Referring to FIG. 7A, a subnetwork data protocol data unit (SN-Data PDU) is illustrated. Referring to FIG. 7B, a subnetwork unitdata protocol data unit (SN-Unitdata PDU) is illustrated. The CWCP header in each case occurs before the Data.

In the SN-Data PDU of FIG. 7A, the CWCP header includes X, C, T, and M indicators, a wireless protocol ID, DCOMP, and PCOMP fields. In the SN-Unitdata PDU of FIG. 7B, the CWCP header includes X, C, T, and M indicators, a wireless protocol ID, DCOMP, PCOMP, Segment Number, Sequence Number, E bit, and Sequence Number (continued) fields. The number of bits in each is indicated above in FIGS. 7A and 7B.

The X indicator is always a logical zero ("0") and not a logical one ("1"). The C indicator is a compression indicator. If C is set to 0, indicating no compression, then the DCOMP and PCOMP fields are not included as part of the header. If C is set to 1, indicating compression, then the DCOMP and PCOMP fields are included as part of the header. The T indicator indicates the type of subnetwork data (SN-PDU) protocol being used. If T is set to 0, the SN-DATA PDU type is selected for acknowledged data link service. If T is set to 1, the SN-UNITDATA PDU type is selected for unacknowledged data link service. The M indicator, the More Bit Indicator, indicates if there are more segments of data or if this PDU represents the last segment. If M is set to 0, then the last segment is being indicated. If M is set to 1, the given segment is not the last segment. The DCOMP field indicates the type of Data Compression coding used to compress the data in the data fields of the PDUs. The PCOMP field indicates the Protocol Control Header Compression Coding that is used to compress the header. The E bit, the Extension bit, is used to indicate the range over which the sequence number extends. If the E-bit is set to 0, the sequence number range is over 0-2047 which is identified by an 11 bit sequence number. If the E-bit is set to 1, the sequence number range is over 0-524287 which is identified by a 19 bit sequence number.

The SN-Data PDUs illustrated in FIG. 7A are conveyed over the acknowledged data link service. An ACK (acknowledge) or NACK (not acknowledged) indicator is sent by the receiver using the acknowledgment data link service to respectively indicate that a message was completely received or was not completely received. Since the acknowledged data link service provides reliable sequenced data frame delivery, the CWCP header only needs an indicator to signal the last segment of a network layer packet.

The SN-Unitdata PDUs illustrated by FIG. 7B are conveyed over the unacknowledged data link service. With no acknowledgment, the SN-Unitdata header provides a sequence number and a segment number. With the sequence number and the segment number, the receiver can reliably reassemble the complete network data packet, or at least recognize a loss of segments. If a loss is recognized, a receiver can ask for retransmission of the lost segments.

Referring now to FIG. 8, a table of wireless protocol identifiers (WPID) is illustrated as one embodiment of the invention. The wireless protocol identifier are bits 0-3 of the first line of the CWCP header illustrated in the PDUs (i.e., Wireless Protocol ID) of FIGS. 7A and 7B. To manage the sharing of a data link connection by multiple wireless protocols, the CWCP uses the data segments with the Wireless Protocol Identifier (WPID). In the embodiment of the table of wireless protocol identifiers (WPID) illustrated by FIG. 8, wireless local area network (WLAN) or WiFi (IEEE 802.11a, 802.11b, 802.11g, etc.) is indicated by WPID set to 1 or bits 0001. CDMA is indicated by WPID set to 2 or bits 0010. GMS/GPRS is indicated by WPID set to 3 or bits 0011. WCDMA is indicated by WPID set to 4 or bits 0100. WPID of 0 and 5-15 are reserved for future use.

A wireless communication link is a precious resource because its bandwidth limited, difficult to make reliable wireless connections and usage fees are greater than a wired connection. Typical network layer protocols are unaware that a communication link is a wireless communication link that should be specially treated and as such and can be inefficient users of link layer resources. CWCP can provide a network layer protocol that is wireless aware and more efficient use link layer resources.

Referring now to FIGS. 9A-9B, diagrams illustrate TCP segments 900A-900B with compressed TCP/IP Protocol Headers 902A-902B for CWCP. Under CWCP, a more efficient transfer of network layer protocol data units may be made by compressing the header. In one embodiment, the header is compressed in accordance to a packet header compression technique made popular by Van Jacobson in International Organization for Standardization (ISO) Network Working Group's Request for Comments: 1144, (RFC 1144), entitled "Compressing TCP/IP Headers for Low-Speed Serial Links". Much of the data within a TCP/IP header is either static (e.g. Source and destination addresses remaining the same during a communication session), or changes in a highly predictable manner (e.g. Sequence number incrementing by one).

The headers of sequential protocol data units of a TCP/IP connection are expected to proceed in the normal predictable manner. Therefore, instead of transmitting the expected header information in every TCP/IP PDUs, the standard TCP/IP header field is replaced with a single octet that identifies any header information that has changed unpredictably.

In FIG. 9A, the single octet of header information that is always sent with the data is the change byte 903 illustrated with bits O, C, I, P, S, A, W, and U. The bits C, I, P, S, A, W, and U indicate whether or not a TCP/IP header field has changed unpredictably, such as the sequence number not incrementing by one or the source and destination addresses of the wireless link changing, for example. Note that the first bit (bit "0") in the Change Byte 903 is not used. Bit C when set, indicates that a valid compressed TCP/IP header is provided. Otherwise when Bit C is not set, it indicates that the packet is in error or it is uncompressed. Bit P of the TCP/IP header is a TCP push bit. When bit P is set, it indicates that the packet is to be prioritized to be sent or received immediately without buffering.

If no header field has changed unpredictably, only the change byte 903 need be sent with the data as the header 902A as illustrated in FIG. 9A. _If one or more fields of the header information have changed in an unexpected manner, the bits C, I, P, S, A, W, and U of the change byte 903 identifies the one or more fields of header information that have changed unexpectedly. In this case, included with the change byte 903 are a connection identifier 905, a TCP checksum 907, and the one or more fields of header information, which have changed in the unexpected manner. The one or more new or changed header field values are provided in order in octets immediately following the TCP checksum 907.

FIG. 9B illustrates this case in which a change in one or more fields of header information has occurred. Referring to FIG. 9B, as discussed previously, the Change Byte 903 indicates which header fields have changed and are a part of the TCP segment 900B. The first bit (bit "O") in the Change Byte 903 is not used. As previously discussed, bit C indicates that a valid compressed TCP/IP header is provided when it is set. Bit I indicates whether or not the IP address has changed and if so, the Delta IP header field is included. As previously discussed, bit P when set indicates that the packet is to be prioritized to be sent or received immediately without buffering. Bit S indicates whether or not the sequence header field has changed and if so, the Delta sequence header field is included. Bit A indicates whether or not the acknowledgment header field has changed and if so, the Delta Ack header field is included. Bit W indicates whether or not the sliding window size header field has changed and if so, the Delta Window header field is included. Bit U indicates whether or not the Urgent Pointer header field has changed and if so, the Urgent Pointer header field is included.

The second byte in the TCP segment 900B illustrated in FIG. 9B is the connection identifier 905 that is used to differentiate the complete header of each active connection. The TCP checksum 907 is provided to perform error checking. After the TCP checksum 907, the one or more of the changed header fields (i.e., Urgent Pointer header field, Delta Window header field, Delta Ack header field, Delta sequence header field, Delta IP header field) are provided as part of the compressed header 902B prior to the data field. Further details of protocol header compression technique can be found in RFC 1144, previously cited.

In addition to compressing the header using protocol header compression techniques, the data field of the TCP segment 900A-900B may be compressed as well. The data field may be compress used V.42bis data compression, for example. The compression algorithm relies on efficiently encoding data prior to transmission such that strings of user data octets are represented by a sequence of code words in fewer bits. Details of V.42bis data compression can be found in the "Recommendation V.42 bis DATA COMPRESSION PROCEDURES FOR DATA CIRCUIT TERMINATING EQUIPMENT (DCE) USING ERROR CORRECTING PROCEDURES" by the International Telegraph and Telephone Consultative Committee (i.e., CCITT-V.42bis).

Figure 10:
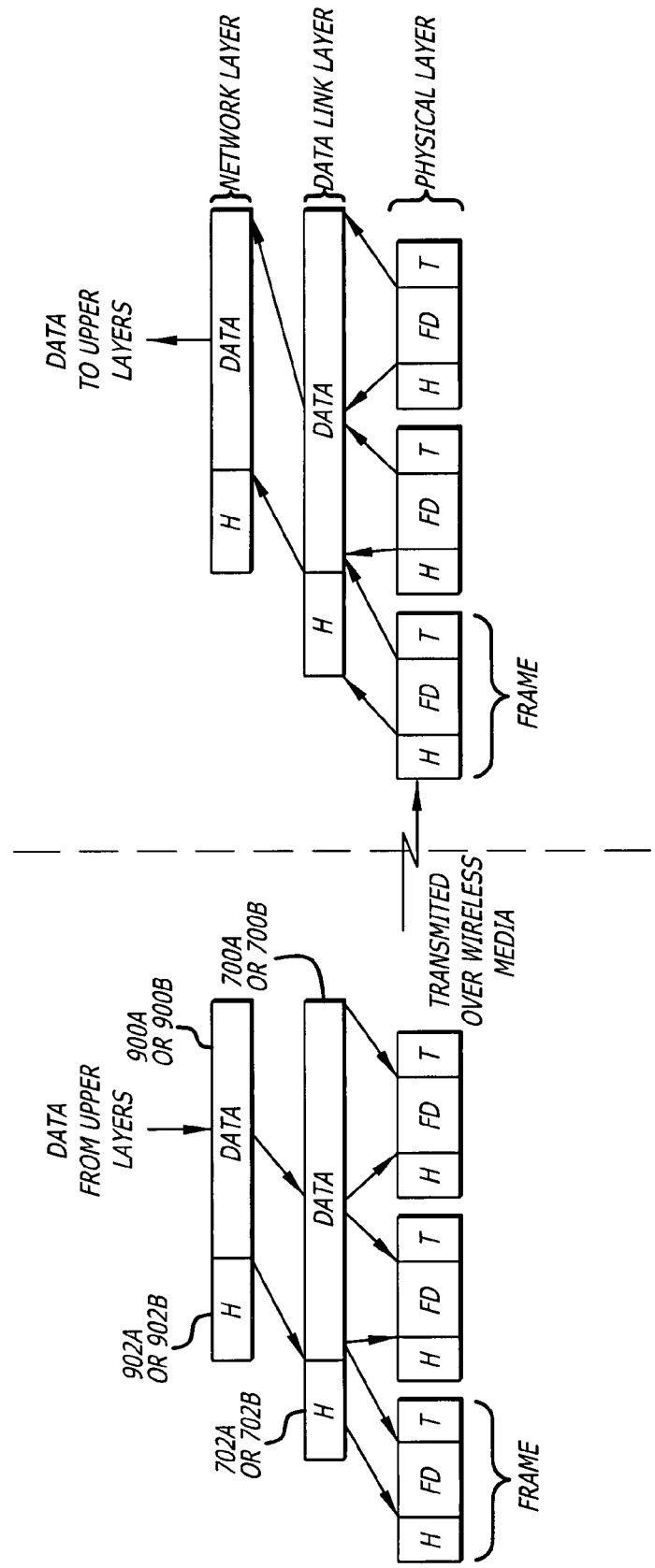
FIG. 10 is a diagram illustrating how the CWCP protocol is used to package data into packets at various layers of the CWCP Protocol Stack for communication over a wireless communication link.

Referring now to FIG. 10, a diagram illustrates how the CWCP protocol is used to package data into packets at the various layers for transport from a mobile unit to a base station or the base station to the mobile unit over a wireless communication link.

Data from upper layers of the stack are packetized or packed into the data field of the TCP segments 900A or 900B. The TCP segments 900A or 900B, which may include the compressed TCP/IP header 902A or 902B and a compressed data field as previously described, from the network layer are packetized or packed into the data field of the subnetwork data protocol data unit (SN-Data PDU) 700A or the subnetwork unitdata protocol data unit (SN-Unitdata PDU) 700B of the CWCP at the data link layer. The SN-Data PDU 700A and the SN-Unitdata PDU 700B include the headers 702A and 702B respectively with the data field. The SN-Data PDU 700A and the SN-Unitdata PDU 700B are then segmented into framed data FD at the physical layer. A head H and a tail T is added sandwiching the framed data FD to form a frame for transmission over the wireless media. The frame is then modulated onto a carrier frequency using the wireless system designated by the wireless protocol ID of the SN-Data PDU 700A or the SN-Unitdata PDU 700B of CWCP.

At a receiving end, the frames are received over the carrier, data demodulated there from, and then processed up the stack layers. The framed data FD from the physical layer is reassembled into SN-Data PDU 700A or the SN-Unitdata PDU 700B as the case may be. The data field of the SN-Data PDU 700A or the SN-Unitdata PDU 700B is then partitioned into TCP segments 900A or 900B as the case may be. The data field of the TCP segments 900A and 900B are passed further up the layers towards the desired application.

Referring momentarily back to FIGS. 6A and 6B, embodiments of a CWCP protocol stack have been shown and described. However, the invention should not be limited to these embodiments of the CWCP protocol stack as the segmentation and compression of network packets as previously described may be adapted to different types of wireless data frame requirements through CWCP. The CWCP protocol stack can be expanded to accommodate any particular number and/or type of wireless interfaces to which a mobile device may connect. CWCP may be used to allow any mobile device to connect to any wireless network.

Figure 11:
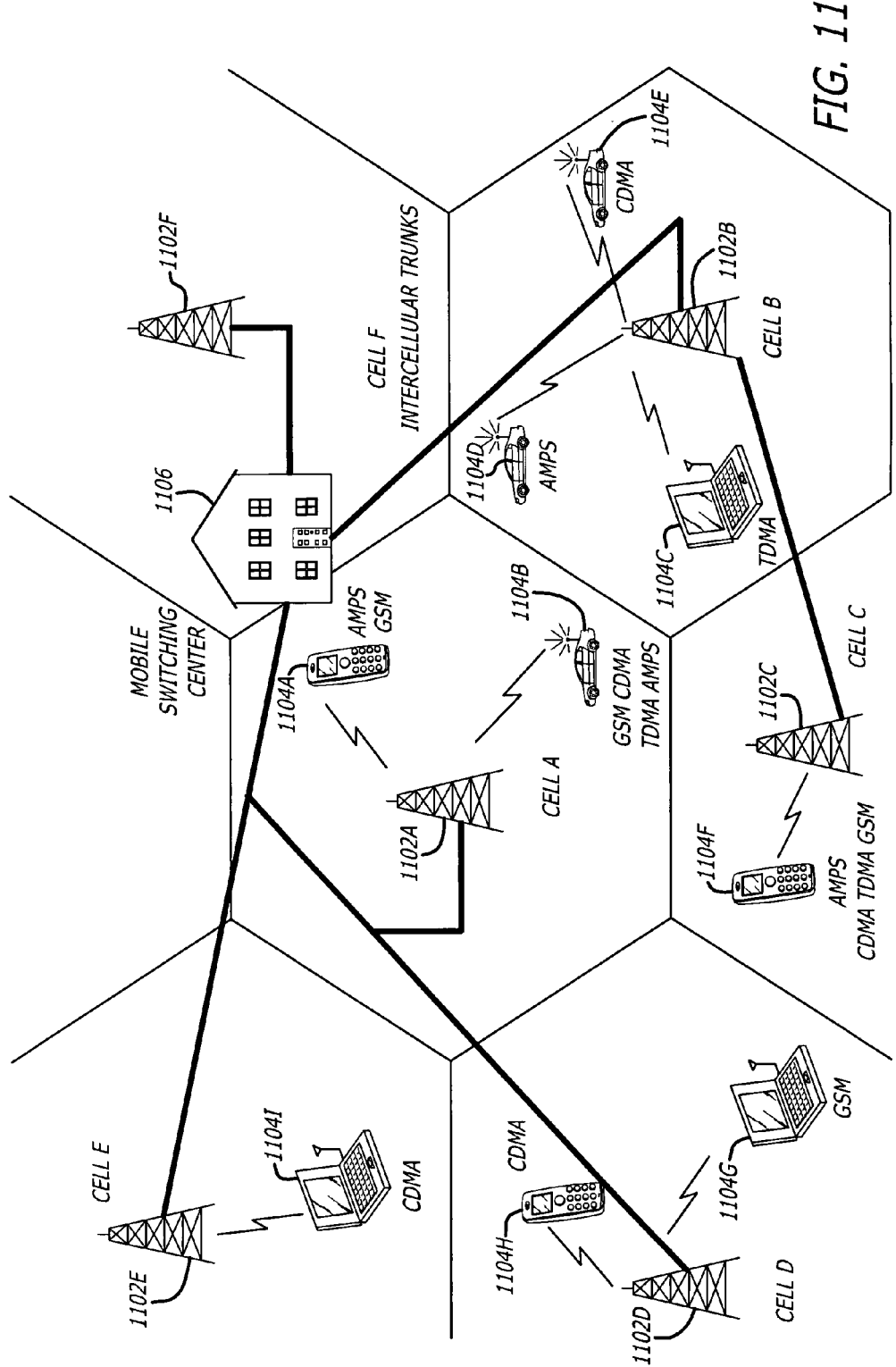
FIG. 11 is a cellular communication system employing CWCP.

Referring now to FIG. 11, a cellular communication system employing CWCP is illustrated. The cellular communication system includes base stations 1102A-1102F, mobile devices or units 1104A-1104I and a switching center 1106. The mobile devices or units 1104A-1104I may be cellular telephones, personal digital assistants, or portable computers, for example. The base stations 1102A-1102F and their one or more antennas form cell boundaries of cells A-F. The base stations 1102A-1102F may couple to the switching center 1106 through intercellular trunk lines. The intercellular trunk lines may be fiber optic cables, wire cables, or microwave relay lines.

The cellular communication system illustrated in FIG. 11 is a multimode communication system. One or more of the mobile devices may use differing methods of wireless communication with the base stations. That is, the radio frequency modulation/demodulation at the physical link layer and the type of digital coding used at the data link layer may be different depending upon the type of wireless communication mode. Consider the mobile devices 1104H and 1104G in cell D, for example. Wireless device 1104H may wirelessly communicate with the base station 1102D using a CDMA communication link while wireless device 1104G may communicate with the base station 1102D using a GSM communication link. As another example, consider wireless device 1104F in cell C. The wireless device 1104F is a multimode communication device and may communicate with the base station 1102C using one or more types of wireless communication links such as AMPS, CDMA, TDMA, or GMS. As yet another example, consider wireless devices 1104A and 1104B in cell A. Wireless device 1104A may communicate with the base station 1102A using AMPS or GSM. Wireless device 1104B may communicate with the base station 1102A using one or more types of wireless communication links such as AMPS, CDMA, TDMA, or GMS. In this manner, the base stations may be shared by the differing communication links. Additional sites of base stations need not be used for the differing types of communication links.

Figure 12A:
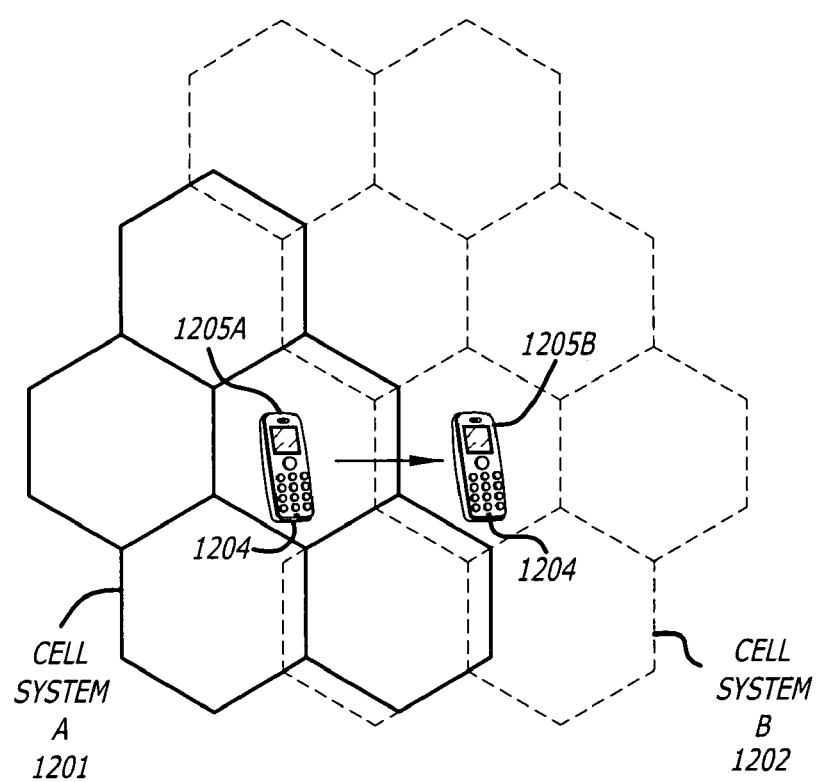
FIG. 12A is a diagram illustrating another application of CWCP to provide seamless handoffs (i.e., seamless roaming) between different cellular communication systems, without loss of a communication session.

Referring now to FIG. 12A, another application of CWCP is illustrated. CWCP can provide seamless handoffs (i.e., seamless roaming) between different cellular communication systems, without loss of a communication session. FIG. 12A illustrates a cellular communication system A, a cellular communication system B, and a mobile device 1204 moving from one position 1205A to another position 1205B. Cellular communication system B differs from cellular communication system A. For example, cellular communication system A may only provide CDMA communication links and cellular communication system B may only provide GSM communication links. With the mobile device 1204 being a multimode communication device, supporting both CDMA and GSM, CWCP facilitates seamless handoffs from communication system A to communication system B as it changes from position 1205A to position 1205B. The wireless ID within CWCP determines which type of wireless communication link is to be used.

Figure 12B:
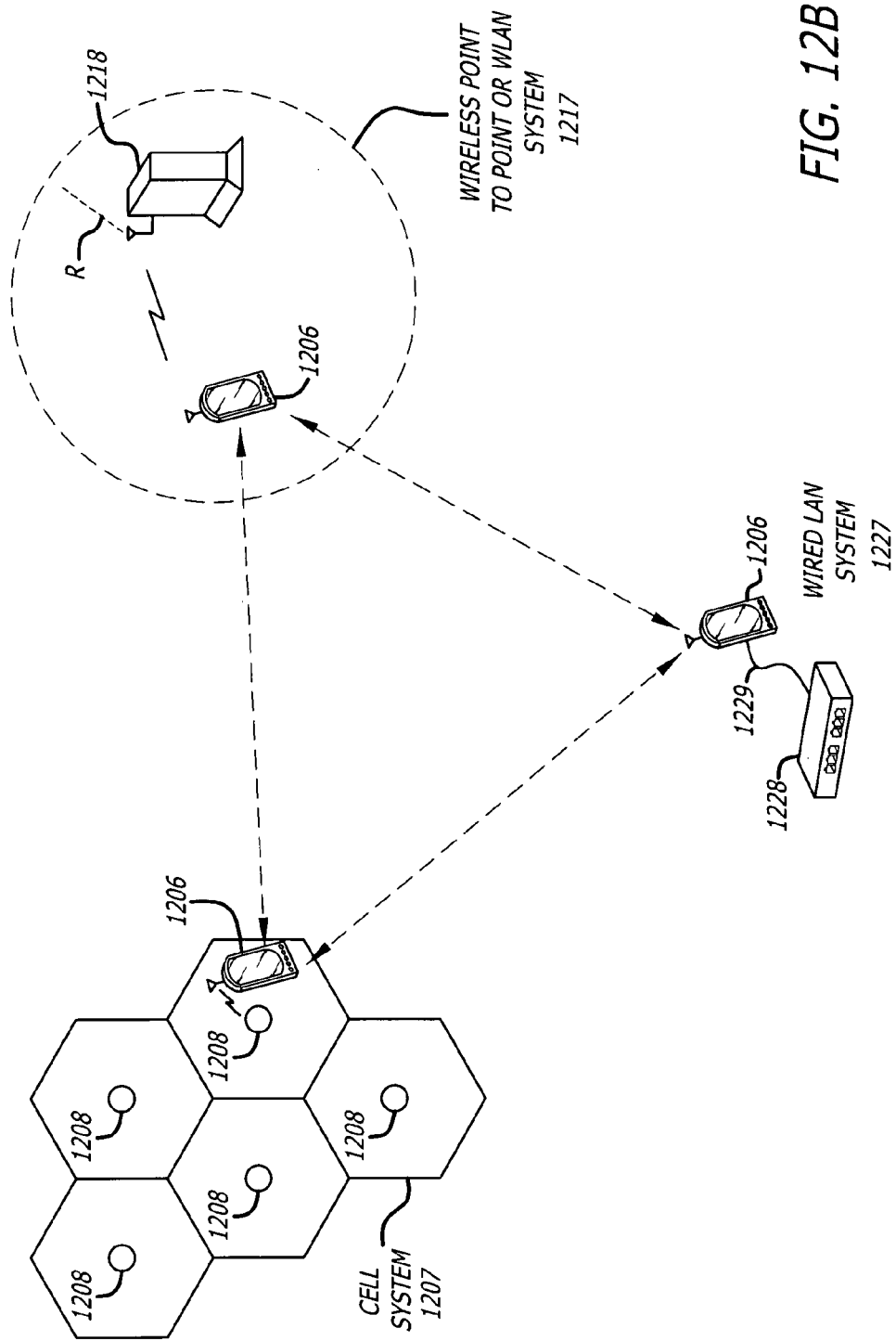
FIG. 12B is a diagram illustrating yet another application of CWCP to provide a unified interface within a mobile device for communicating over different communication systems.

Referring now to FIG. 12B, another application of CWCP is illustrated. CWCP can provide a unified interface within a mobile device for communicating over different communication systems.

FIG. 12B illustrates a mobile device 1206 wirelessly communicating in a cellular communication system 1207 in a first position, wirelessly communicating in a wireless point to point or wireless local area network (WLAN) communication system 1217 in a second position, and communicating by wired means in a wired local area network (LAN) communication system 1227 in a third position.

In the first position, the mobile device 1206 wireless communicates with the base stations 1208 within the cellular communication system 1207. In the second position, the mobile device 1206 wirelessly communicates with the wireless router 1218 within a radius of R in a point-to-point fashion. The wireless router 1218 may then be connected to a network through wires, cables, optical fiber, or other means. Instead of a wireless router 1218, another type of wireless base station may be provided to obtain access to a communication or computer network in a point-to-point manner. In the third position, the mobile device 1206 communicates with the router 1228 over the cable 1229 in a tethered or wired fashion. The router 1228 may instead be a bridge, hub, or other network interface device.

With CWCP the mobile device 1206 can browse the Internet in any of these positions over the different communication systems, for example. Because the application of the Internet browser is at the application layer, the communication link is transparent to it by the use of CWCP. That is, the layers above CWCP are indifferent to which wireless communication system is being used to provide service. However to a user, there may be a preference as to which communication link is available to provide the faster data communication. Thus if CWCP determines that more than one communication link is available, it can select the faster data rate transparent to a user.

Figure 13B:
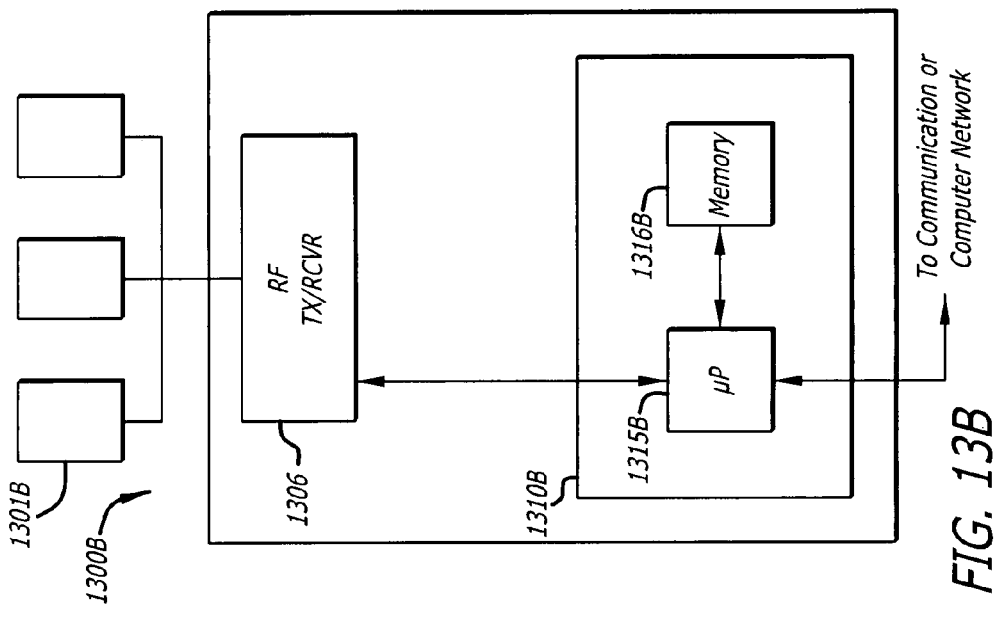
FIG. 13B is a block diagram illustrating a second exemplary embodiment of a base station for executing CWCP.
Figure 13A:
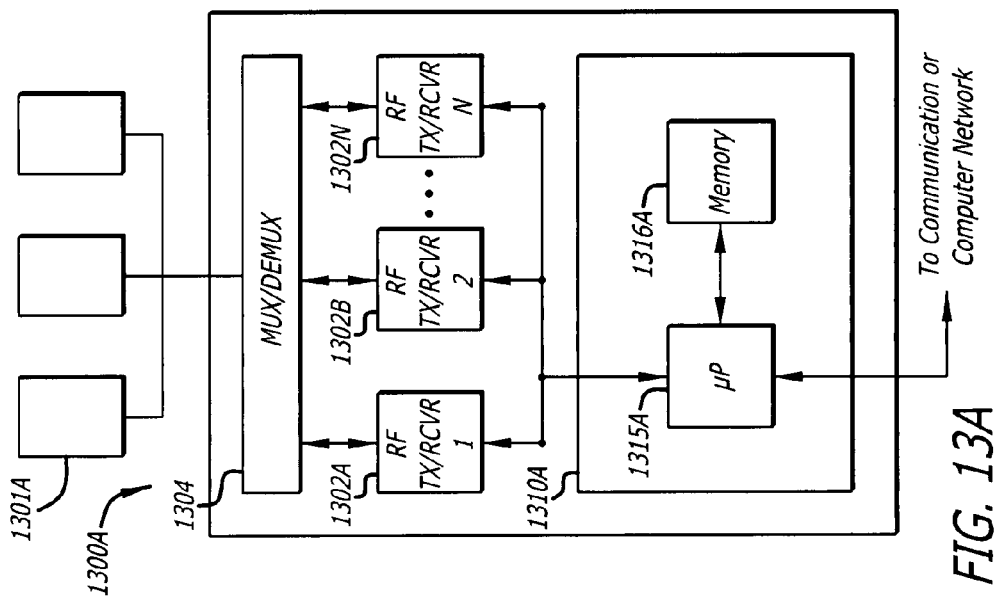
FIG. 13A is a block diagram illustrating a first exemplary embodiment of a base station for executing CWCP.

Referring now to FIGS. 13A-13B exemplary embodiments of base stations 1300A-1300B are illustrated for implementation of CWCP to facilitate a multimode cellular communication system. The base stations 1300A-1300B support multimode or differing types of wireless communication modes. Base stations 1300A and 1300B differ in how the radio frequency transceivers are unified to a single antenna 1301A and 1301B respectively. Either base station 1300A or 1300B may be utilized to support the multimode cellular communication system described previously with respect to FIG. 11.

In base station 1300A, a plurality of radio frequency transceivers 1302A-1302N have signals multiplexed into the antenna 1301A by the multiplexer/demultiplexer 1304. Similarly, signals from the antenna 1301A are demultiplexed by the multiplexer/demultiplexer 1304 into the respective one of the plurality of radio frequency transceivers 1302A-1302N. The plurality of radio frequency transceivers 1302A-1302N couple to the microprocessor 1315A of the computer 1301A and bidirectionally communicate data therewith. The plurality of radio frequency transceivers 1302A-1302N are used to wirelessly communicate using the differing wireless communication protocols such as CDMA, GSM, TDMA, etc.

The computer 1310A includes the microprocessor 1315A and the memory 1316A. Software code to implement CWCP may be stored in the memory 1316A or other storage device (e.g., hard disk) of the computer for execution by the microprocessor 1315A. The computer 1310A and microprocessor 1315A therein externally couple to a communication network or computer network depending upon the type of system where it is utilized. The communication network may be a cellular telephone communication system with a connection to the plain old telephone system (POTS). The computer network may be a wireless local area network for example with a connection to the Internet.

In base station 1300B, a single radio frequency transceiver 1306 is provided coupled to the antenna 1301B. The radio frequency transceiver 1306 is a unified hardware component that can support the multiple types of wireless communication modes, such as CDMA, GSM, TDMA, etc. The radio frequency transceiver 1306 couples to the microprocessor 1315B of the computer 1301B for bidirectionally communicating data therewith. The computer 1310B includes the microprocessor 1315B and the memory 1316B. Software code to implement CWCP may be stored in the memory 1316B or other storage device (e.g., hard disk) of the computer for execution by the microprocessor 1315B. The computer 1310B and microprocessor 1315A therein externally couple to a communication network or computer network depending upon the type of system where it is utilized. The communication network may be a cellular telephone communication system with a connection to the plain old telephone system (POTS). The computer network may be a wireless local area network for example with a connection to the Internet.

Figure 14:
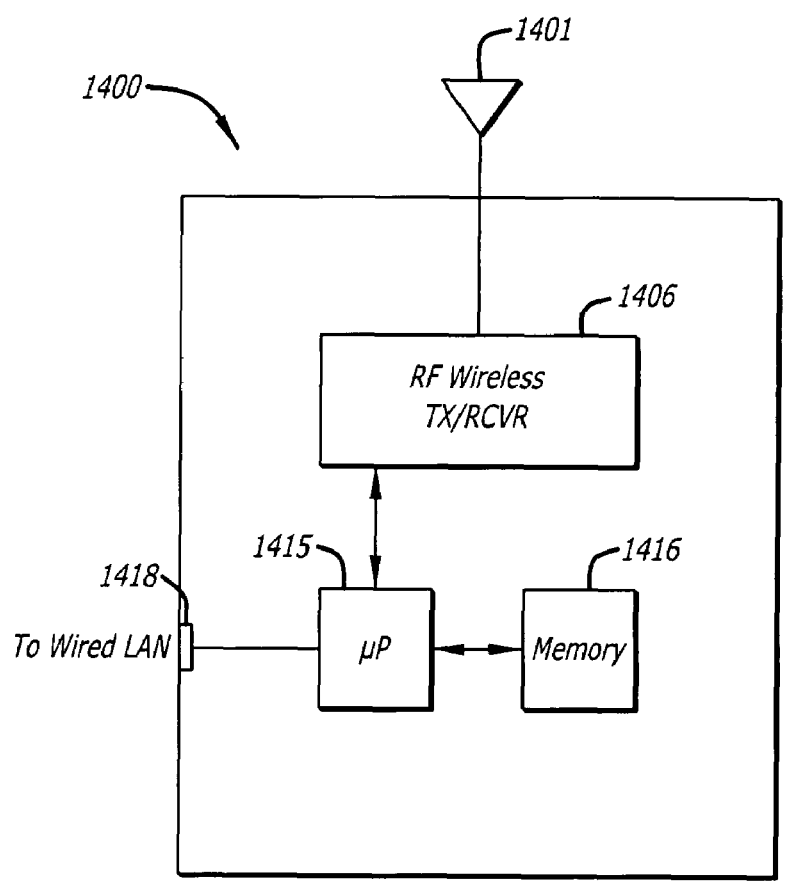
FIG. 14 is a block diagram of an exemplary embodiment of a mobile device or unit for executing CWCP.

Referring now to FIG. 14, an exemplary embodiment of a mobile device or unit 1400 is illustrated for implementation of CWCP to facilitate a multimode communication system. The mobile device or unit 1400 supports multimode or differing types of wireless communication modes. The mobile device or unit 1400 may be utilized in the multimode cellular communication system described previously with respect to FIG. 11, the differing cellular communication systems described previously with respect to FIG. 12A, and the different communication systems described previously with respect to FIG. 12B.

The mobile device or unit 1400 includes an antenna 1401, a single radio frequency transceiver 1406, a microprocessor 1415 and the memory 1416. The single radio frequency transceiver 1406 is coupled to the antenna 1401 to transmit and receive radio waves. The radio frequency transceiver 1406 is a unified hardware component that can support the multiple types of wireless communication modes, such as CDMA, GSM, TDMA, etc. The radio frequency transceiver 1406 couples to the microprocessor 1415 for bidirectionally communicating data therewith. The microprocessor 1415 is coupled to the memory 1416 to read instructions for execution and to read and write data therewith. Software code to implement CWCP may be stored in the memory 1416 or other storage device therein for execution by the microprocessor 1415. The mobile device or unit 1400 may further include a connector 1418 to externally couple it and the microprocessor 1415 to a communication network or computer network by a cable or other wired means. The communication network may be the plain old telephone system (POTS). The computer network may be a wired local area network for example with a connection to the Internet.

The Common Wireless Communications Protocol provides plug-and play capability of mobile devices into a wireless network. For low cost mobile devices like cell phones, CWCP for a given cell phone provides a self-configurable plug-in between the application software and the differing communication interfaces in order to support different wireless standards. As new communication standards continue to evolve, CWCP can continue to grow and support legacy standards so that backward compatibility is maintained. With new air interface modulation/demodulation in the future for wireless mobile devices providing increased data rates, physical layer hardware interface changes will be required. CWCP provides the same software interface for existing application software and can be adapted to these new hardware interfaces so it is transparent to the application software. In this manner, existing customers may be upgraded to new hardware with little to no apparent change to a user.

With CWCP, common software, common platforms, and a common environment can be provided to a user with individual physical plug-in interfaces. Providing common software, common platforms, and a common environment, software development can be merged together and simplify configuration control, unify development process, simplify distribution, and provide cost savings in infrastructure support. CWCP allows a single mobile terminal (computer or phone) to travel or roam around the world with the same look and feel. Interoperability between differing communication systems using CWCP is key for a network centric environment.

CWCP provides a common software interface to unify a company's heterogeneous network centric products using a common interoperable software package. A common software package provides standard software life cycle support, development and enhancements that can continue to improve quality, and legacy systems support and continue the addition of newly developed communication standards. CWCP is ideal for network content providers and can facilitate the provision of music, video, Internet or e-commerce solutions using a common interoperable software package.

When implemented in software, the elements of the present invention are essentially the code segments to perform the necessary tasks. The program or code segments can be stored in a processor readable medium or transmitted by a computer data signal embodied in a carrier wave over a transmission medium or communication link. The "processor readable medium" may include any medium that can store or transfer information. Examples of the processor readable medium include an electronic circuit, a semiconductor memory device, a ROM, a flash memory, an erasable ROM (EROM), a floppy diskette, a CD-ROM, an optical disk, a hard disk, a fiber optic medium, a radio frequency (RF) link, etc. The computer data signal may include any signal that can propagate over a transmission medium such as electronic network channels, optical fibers, air, electromagnetic, RF links, etc. The code segments may be downloaded via computer networks such as the Internet, Intranet, etc.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art. For example, the invention has been described in terms of specific types of wireless networks and wireless network interfaces, those skilled in the art will appreciate the invention is not so limited and that any wireless network and associated network interface can be accommodated. Rather, the invention should be construed according to the claims that follow below.

What is claimed is:

1. A mobile device for seamless multimode wireless communication over a plurality of wireless communication systems, the mobile device comprising:
   an antenna;
   a wireless transceiver coupled to the antenna, the wireless transceiver for communicating over a first wireless communication system and a second wireless communication system;
   a processor coupled to the wireless transceiver;
   a processor readable storage medium coupled to the processor; and
   processor readable code stored in the processor readable storage medium for execution by the processor to
      to pack transmit data into packet data units for transmission over one of the first wireless communication system and the second wireless communication system, the packet data units having a header with a wireless protocol identifier to identify one of the first wireless communication system and the second wireless communication system over which the packet data units are transmitted, and
      to unpack packet data units received over one of the first wireless communication system and the second wireless communication system into receive data, the packet data units having the header with a wireless protocol identifier to identify one of the first wireless communication system and the second wireless communication system over which the packet data units are received.

2. The mobile device of claim 1 wherein
   the processor readable code stored in the processor readable storage medium for execution by the processor further
   to compress data fields as the data to be packed into the packet data units for transmission, and
   to decompress the data unpacked from the packet data units into data fields.

3. The mobile device of claim 2 wherein
   the processor readable code stored in the processor readable storage medium for execution by the processor further to
   compress header fields with the data fields as the data to be packed into the packet data units for transmission, and
   decompress the data unpacked from the packet data units into data fields and header fields.

4. The mobile device of claim 3 wherein
the header further includes a compression indicator indicating the header field and data field of a packet data unit are compressed and the type of header compression coding and the type of data compression coding.
5. The mobile device of claim 3 wherein
the header further includes a segment number and a sequence number.
6. The mobile device of claim 1 wherein
the first wireless communication system is a first cellular telephone system, and
the second wireless communication system is a second cellular telephone system having a different wireless communication protocol than the first cellular telephone system.
7. The mobile device of claim 1 wherein
the processor readable code stored in the processor readable storage medium for execution by the processor further to
seamlessly handoff a communication session from the first wireless communication system to the second wireless communication system without dropping the communication session.
8. The mobile device of claim 1 wherein
the first wireless communication system is a cellular telephone system, and
the second wireless communication system is a wireless local area network (WLAN) having a different wireless communication protocol than the cellular telephone system.
9. The mobile device of claim 1 wherein
the header further includes a segment number and a sequence number, and
the data is one or more TCP/IP segments.
10. A base station of a plurality of base stations within a wireless communication system for multimode wireless communication, the base station comprising:
an antenna;
a wireless transceiver coupled to the antenna, the wireless transceiver for wireless communication using a plurality of wireless communication protocols;
a processor coupled to the wireless transceiver;
a processor readable storage medium coupled to the processor; and
processor readable code stored in the processor readable storage medium for execution by the processor
to pack transmit data into packet data units for transmission over the wireless communication system using one of the plurality of wireless communication protocols, the packet data units having a header with a wireless protocol identifier to identify the one of the plurality of wireless communication protocols with which the packet data units are to be transmitted, and
to unpack packet data units received from the wireless communication system into receive data, the packet data units having the header with a wireless protocol identifier to identify the one of the plurality of wireless communication protocols with which the packet data units are received.

11. The base station of claim 10 wherein
the processor readable code stored in the processor readable storage medium for execution by the processor further
to compress data fields as the data to be packed into the packet data units for transmission, and
to decompress the data unpacked from the packet data units into data fields.
12. The base station of claim 11 wherein
the processor readable code stored in the processor readable storage medium for execution by the processor further
to compress header fields with the data fields as the data to be packed into the packet data units for transmission, and
to decompress the data unpacked from the packet data units into data fields and header fields.
13. The base station of claim 12 wherein
the header further includes a compression indicator indicating the header field and the data field of a packet data unit are compressed and the type of header compression coding and the type of data compression coding.
14. The base station of claim 12 wherein
the header further includes a segment number and a sequence number.
15. The base station of claim 10 wherein
the processor readable code stored in the processor readable storage medium for execution by the processor further
to seamlessly handoff a communication session from the wireless communication system to another different wireless communication system without dropping the communication session.
16. The base station of claim 15 wherein
the one wireless communication system serves a first geographic region, and
the another different wireless communication system serves a second geographic region substantially different from the first geographic region.
17. The base station of claim 10 wherein
the header further includes a segment number and a sequence number, and
the data is one or more TCP/IP segments.
18. The base station of claim 10 wherein
the plurality of wireless communication protocols is AMPS, GSM, CDMA, TDMA, CDMA2000 and WCDMA.
19. The base station of claim 10 wherein
the plurality of wireless communication protocols is WLAN, WIFI, GPRS and Bluetooth.
20. The base station of claim 10 wherein
the wireless transceiver is
a multiplexer and demultiplexer coupled to the antenna, and
a plurality of wireless transceivers one for each of the plurality of wireless communication protocols, the plurality of wireless transceivers coupled to the multiplexer and demultiplexer and to the processor.

* * * * *